United States Patent
Ye et al.

(10) Patent No.: US 9,559,742 B2
(45) Date of Patent: *Jan. 31, 2017

(54) PROTECTIVE CASE FOR A TABLET COMPUTER

(71) Applicant: Huizhou TCL Mobile Communication Co., Ltd., Huizhou, Guangdong (CN)

(72) Inventors: Wenyi Ye, Guangdong (CN); Wenliang Lu, Guangdong (CN); Junhao Yuan, Guangdong (CN); Wei Ma, Guangdong (CN); Xuelong Ronald Hu, Guangdong (CN); Vittorio Di Mauro, Guangdong (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,413

(22) Filed: May 7, 2015

(65) Prior Publication Data

US 2016/0142091 A1 May 19, 2016

(30) Foreign Application Priority Data

Nov. 18, 2014 (CN) ...................... 2014 2 0694271 U

(51) Int. Cl.
*H04M 1/00* (2006.01)
*H04B 1/3888* (2015.01)
(Continued)

(52) U.S. Cl.
CPC ............. *H04B 1/3888* (2013.01); *A45C 11/00* (2013.01); *H04B 1/3877* (2013.01); *A45C 2011/003* (2013.01)

(58) Field of Classification Search
CPC ... H04B 1/3888; H04B 1/3877; H04B 1/3838; H04B 7/15535; A45C 2011/003; A45C 11/00; A45C 2011/002; G06F 1/1628; H01Q 1/243; H01Q 1/245
(Continued)

(56) References Cited

U.S. PATENT DOCUMENTS 8,599,542 B1 * 12/2013 Healey .................. G06F 1/1626
345/168
8,807,333 B1 * 8/2014 Cooper .................. A45C 11/00
206/320

(Continued)

*Primary Examiner* — Babar Sarwar
(74) *Attorney, Agent, or Firm* — Klein, O'Neill & Singh, LLP

(57) ABSTRACT

The present disclosure generally relates to a protective case for a tablet computer, includes: a front plate (110) having a first surface (111) configured to protect a display surface of the tablet computer, wherein a magnetic element (112) is installed on the first surface (111); a holding plate (120) being configured to hold a back of the tablet computer; a supporting plate (130) connecting the front plate (110) and the holding plate (120) to prop up the tablet computer; wherein the magnetic element (112) can be installed at different positions on the first surface (111), in order to enable the tablet computer to stand up at different angles. The magnetic element (112) installed on the first surface (111) of the front plate (110) is attracted with a bottom end of the tablet computer, thus a steady triangle frame is formed between the tablet computer and the folded protective case, further enabling the tablet computer to stand up at different angles.

19 Claims, 2 Drawing Sheets

(51) Int. Cl.
*A45C 11/00* (2006.01)
*H04B 1/3877* (2015.01)

(58) Field of Classification Search
USPC ... 455/566, 575.1, 575.3, 575.8, 90.3, 550.1
See application file for complete search history.

(56) References Cited

U.S. PATENT DOCUMENTS

| | | | | |
|---|---|---|---|---|
| D752,593 S | * | 3/2016 | Diebel | G06F 1/1679 |
| | | | | D14/440 |
| 2011/0297581 A1 | * | 12/2011 | Angel | F16M 13/04 |
| | | | | 206/736 |
| 2012/0088557 A1 | * | 4/2012 | Liang | G06F 1/1628 |
| | | | | 455/575.1 |
| 2012/0268891 A1 | * | 10/2012 | Cencioni | G06F 1/1626 |
| | | | | 361/679.55 |
| 2013/0178161 A1 | * | 7/2013 | Shulenberger | G06F 1/162 |
| | | | | 455/41.2 |
| 2013/0277271 A1 | * | 10/2013 | Toulotte | A45C 11/00 |
| | | | | 206/752 |
| 2014/0043741 A1 | * | 2/2014 | Smith | G06F 1/16 |
| | | | | 361/679.3 |
| 2014/0209503 A1 | * | 7/2014 | Angel | A45C 11/00 |
| | | | | 206/736 |
| 2014/0216954 A1 | * | 8/2014 | Law | A45F 5/02 |
| | | | | 206/45.23 |
| 2014/0291172 A1 | * | 10/2014 | Rogers | A45C 11/00 |
| | | | | 206/37 |
| 2015/0065208 A1 | * | 3/2015 | Balaji | H04M 1/04 |
| | | | | 455/575.8 |

* cited by examiner

PROTECTIVE CASE FOR A TABLET COMPUTER

CROSS-REFERENCE TO RELATED APPLICATIONS

This application claims all benefits accruing under 35 U.S.C. §119 from China Patent Application No. 201420694271.7, filed on Nov. 18, 2014 in the China Intellectual Property Office, the disclosure of which is incorporated herein by reference. This application is related to a commonly-assigned application, U.S. patent application Ser. No. 14/706,483, filed May 7, 2015, entitled, "A Multifunctional Protective Case With Wireless Router Functionality".

FIELD

The present disclosure herein generally relates to an electronic device package field, more specifically, relates to a protective case for a tablet computer.

BACKGROUND

The customers who have purchased a tablet computer generally use it to watch films or various TV shows in a Cafe, on travel or in bed, thus a tablet protective case with multi-angle support becomes the option of many customers. At present, Apple protective case and other protective cases provided by third parties generally have protective functionality. In addition, to attract customers, the vendors will design a multi-angle support with the protective case.

Many protective cases on the market appear to be a three-fold design as illustrated by FIG. 1. A tablet computer 20 is secured in a protective shell 11, and a supporting shell 12 can be folded into a stand behind the protective shell 11, thus enabling the tablet computer 20 to stand up. However, since the folds on this design are not deep enough, or the protective shell is too thick to fold, the tablet computer can't stand firmly against the folded triangle, in particular when placed on bed.

BRIEF DESCRIPTION OF THE DRAWINGS

Implementations of the present technology will now be described, by way of example only, with reference to the attached figures, wherein.

DETAILED DESCRIPTION

Figure 1:
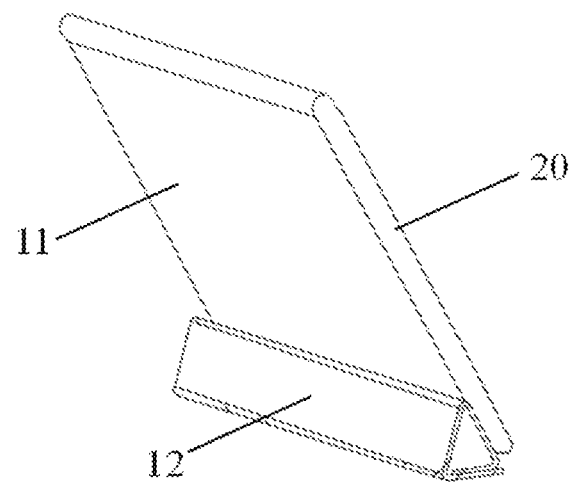
FIG. 1 is a schematic diagram of a prior protective case of with a three-fold design.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "comprising" when utilized, means "including, but not necessarily limited to"; it specifically indicates open-ended inclusion or membership in the so-described combination, group, series and the like.

The present disclosure is described in relation to a protective case for a tablet computer.

Figure 2:
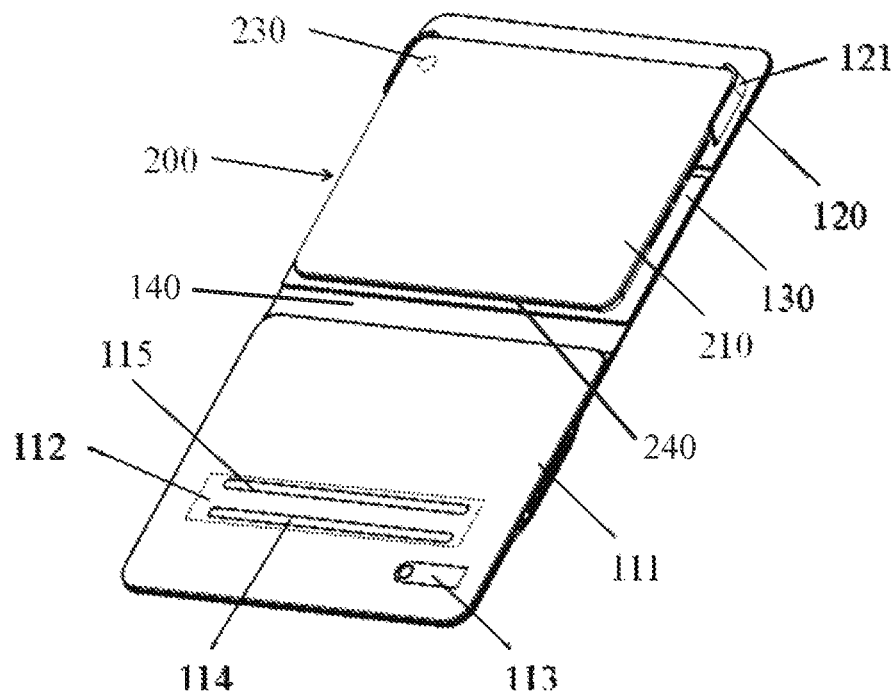
FIG. 2 is a schematic diagram of one embodiment of a protective case for a tablet computer when it is unfolded.
Figure 3:
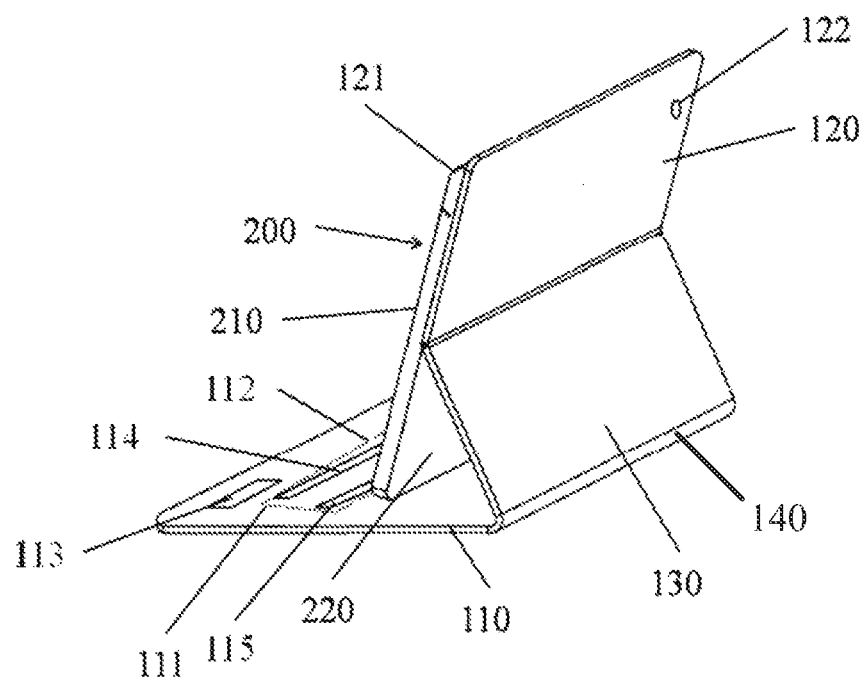
FIG. 3 is a schematic diagram of one embodiment of the protective case when it is used to support the tablet computer.
Figure 4:
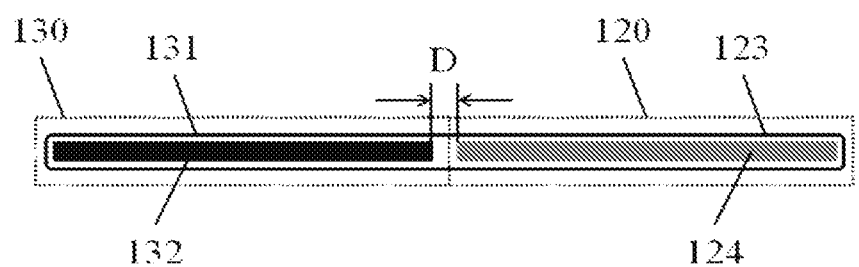
FIG. 4 is a cross sectional view of a holding plate and a supporting plate of one embodiment of the protective case when the plates are unfolded.

FIG. 2 is a schematic diagram of one embodiment of a protective case for a tablet computer when the case is unfolded. FIG. 3 is a schematic diagram of one embodiment of the protective case when the case is used to prop up the tablet computer.

Referring to FIG. 2 and FIG. 3, the protective case is adapted for a tablet computer 200 according to the present disclosure. The tablet computer 200 comprises a display surface 210, a back surface 220 opposite to the display surface 210, and a camera 230 installed at the back surface 220 of tablet computer 200. The tablet computer 200 comprises four peripheral sides. Every two opposite sides are parallel to each other. One of the four peripheral sides is defined as a bottom end 240 which comprises a permanent magnet or a ferromagnetic element.

The protective case comprises a front plate 110, a holding plate 120 and a supporting plate 130 connecting the front plate 110 and the holding plate 120 via a bendable portion 140. Each of the front plate 110, the holding plate 120, the supporting plate 130 and the bendable portion 140 has a rectangular configuration and a same length along an extending direction of the bottom end 240 of the tablet computer 200.

The front plate 110 comprises at least one magnetic element 112 embedded in the front plate 110. The front plate 110 comprises a first surface 111. When the tablet computer 200 is not in use, the first surface 111 of the front plate 110 is attached to the display surface 210 to protect the display surface 210. When the tablet computer 200 is in use, the bottom end 240 of the tablet computer 200 stands on the top surface 111, the front plate 110 can support the bottom end 240 of the tablet computer 200.

The at least one magnetic element 112 comprises a plurality of parallel magnetic protrusions. In one embodiment, the at least one magnetic element 112 of the protective case is two parallel magnetic protrusions: a first magnetic protrusion 114 and a second magnetic protrusion 115 which are embedded in the front plate 110 of the protective case. The second magnetic protrusion 115 is closer to the bendable portion 140, compared with the first magnet protrusion 114. Top surfaces of the first and second magnetic protrusions 114, 115 are coplanar with the first surface 111. The at least one magnetic element 112 can be a first permanent magnet corresponding to the permanent magnet or the ferromagnetic element of the tablet computer 200. A magnetic pole of the first permanent magnet towards the bottom end 240 of the tablet computer 200 is opposite to that of the permanent magnet or the ferromagnetic element of the tablet computer 200 towards the first surface 111.

The holding plate 120 comprises a first holding element 121. The first holding element 121 holds the back of the tablet computer 200 by a latch mechanism. In one embodiment, the holding element 121 comprises a pair of latches for clapping the pair of adjacent peripheral corners which are far away from the bottom end 240. In this way, when the protective case is in a supporting state to prop up the tablet computer 200, the at least one magnetic element 112 is capable of attracting the tablet computer 200 by the permanent magnet or the ferromagnetic element installed in the tablet computer, and the holding element 121 on the holding plate 120 can secure the back of the tablet computer 200, thus preventing the tablet computer 200 from slipping out of the protective case. There is a fold at a joint between the holding plate 120 and the supporting plate 130. The holding plate 120 or the supporting plate 130 can be rotated around the fold.

When the protective case is in the supporting state to prop up the tablet computer 200, the holding plate 120 is attached to an upper portion of the back of the tablet computer 200, the bottom end 240 of the tablet computer 200 is secured on the first magnetic protrusion 114, the first magnetic protrusion 114 will attract with the bottom end 240 of the tablet computer 200 and the supporting plate 130 is spaced from a lower portion of the back of the tablet computer 200. Meanwhile, the holding plate 120 and the supporting plate 130 are folded at the fold to form a certain angle in order to secure and support the tablet computer 200. For the above situation, the tablet computer 200 and the first surface 111 form a 60° acute angle, thus enabling the tablet computer 200 to stand up at a 60° angle towards the first surface 111. Similarly, when the bottom end 240 of the tablet computer 200 is secured on the second magnetic protrusion 115, by the attraction of the magnetic element 112 with the bottom end 240 of the tablet computer 200, facilitated by the secure and support of the holding plate 120 and the supporting plate 130, the tablet computer 200 can stand up at a 45° angle towards the first surface 111.

It should be noted that the tablet computer 200 standing up at a 60° angle or a 45° angle is only one specific mean to illustrate that the protective case can support the tablet computer 200 to stand up at different angles, and it is not intended to be limiting, and similarly, by installing the at least one magnetic element 112 on different positions on the first surface 111 the tablet computer 200 can also stand up at other angles.

The holding plate 120 comprises a first coating layer 123 and a first plate 124 enclosed in the first coating layer 123. The supporting plate 130 comprises a second coating layer 131 and a second plate 132 enclosed in the second coating layer 131. The first coating layer 123 and the second coating layer 131 are connected with each other to form an integrity, and a gap D is determined in the first plate 124 and the second plate 132. The gap D is for instance, 6 mm in width as illustrated in FIG. 3, wherein the gap D has the same width as that of the bendable portion 140. The gap is provided to adapt to the varying angular bending between the holding plate 120 and the supporting plate 130, thus enabling the tablet computer 200 to stand up at varying angles. In this embodiment, the first coating layer 123 and the second coating layer 131 are made of PU leather, and the first plate 124 and the second plate 132 are made of PC sheet material, however, the materials are not intended to be limiting, any other material with similar properties can also be applied.

PU is the abbreviation of polyurethane, and PU leather stands for the leather containing polyurethane constituents. PU leather has broad applications in luggage, clothing, furniture and many other territories for its outstanding abrasive resistance, breathability and ageing resistance together with its strong flexibility and soft and comfortable texture. Wherein the PU leather being applied to the material of the first coating layer 123 and the second coating layer 131, its abrasive resistance, softness and other excellent properties can meet the material requirements of the protective case for the tablet computer. Meanwhile, PC is short for polycarbonate, and polycarbonate is the major constituents of PC plates. The PC plates are sheet material made by thermal forming technologies, and have extensive applications in for instance, package and other territories for its light weight and good mechanical properties.

In the protective case according to this embodiment, a display window 113 is arranged on the first surface 111 near the magnetic element 112 to display the battery status of the tablet computer 200.

A first hole 122 is further defined in the holding plate 120 of the protective case near the first holding element 121. The first hole 122 is in accordance with the camera 230 of the tablet computer 200 in position. The tablet computer 200 can be used not only to get online, but also to shoot a photograph or a video, thus the installment of the first hole 122 facilitates the shooting of the tablet computer 200 when it is used as a camera that the protective case needs not to be taken off.

The first surface 111 of the front plate 110 adhering to the display surface 210 of the tablet computer 200 can be made by a soft material. When the protective case is closed to protect the tablet computer 200, this surface adheres to the display surface 210 of the tablet computer 200, wherein the option of the soft material can well protect the display surface of the tablet computer, thus preventing the display surface 210 of the tablet computer 200 from being scratched.

It should be noted that above embodiments are merely exemplary ones of the present invention. Obviously, the present invention is not limited to above embodiments, but has many variations. All variations that a person skilled in the art derives from or directly reaches form the contents disclosed in the present invention shall be considered as falling into the protective scope of the present invention.

What is claimed is:
1. A protective case for a tablet computer, comprising:
a front plate being configured to support and contact a bottom wall of the tablet computer when the tablet computer stands up and comprising a first surface to protect a display surface of the tablet computer, wherein at least one magnetic element is installed on the first surface;
a holding element on a holding plate configured to secure a back of the tablet computer to the protective case; and
a supporting plate connecting the front plate and the holding plate to support the tablet computer;
wherein the at least one magnetic element is attracted to a corresponding magnetic element of the bottom wall of the tablet computer to enable the tablet computer to stand up at different angles;

wherein the holding plate comprises a first coating layer and a first plate enclosed in the first coating layer, and the supporting plate comprises a second coating layer and a second plate enclosed in the second coating layer;

wherein the first coating layer and the second coating layer are connected to each other to form an integrity, and a gap is defined between the first plate and the second plate.

2. The protective case as claimed in claim 1, wherein the at least one magnetic element comprises a plurality of parallel magnetic protrusions.

3. The protective case as claimed in claim 2, wherein the parallel magnetic protrusions each comprises a first permanent magnet, and a second permanent magnet is installed on one bottom end of the tablet computer corresponding to the first permanent magnet; wherein a magnetic pole of the first permanent magnet towards the bottom end of the tablet computer is opposite to the magnet pole of the second permanent magnet towards the first surface.

4. The protective case as claimed in claim 2, wherein the parallel magnetic protrusions each comprises a first permanent magnet, and a ferromagnetic element is installed on one bottom end of the tablet computer corresponding to the first permanent magnet.

5. The protective case as claimed in claim 1, wherein the first coating layer and the second coating layer comprise polyurethane material, and the first plate and the second plate comprise polycarbonate sheet material.

6. The protective case as claimed in claim 1, wherein a display window is arranged on the first surface near the magnetic element to display a battery status of the tablet computer.

7. The protective case as claimed in claim 1, wherein the holding plate comprises a first holding element; wherein the first holding element holds the back of the tablet computer by a latch mechanism.

8. The protective case as claimed claim 7, wherein a first hole is defined in the holding plate near the first holding element; wherein the first hole is in accordance with a camera of the tablet computer in position.

9. The protective case as claimed in claim 1, wherein the first surface comprises a soft material.

10. A protective case for a tablet computer, comprising:
a front plate configured to support and contact a bottom end of the tablet computer when the tablet computer stands up, the front plate comprising a plurality of magnetic elements, wherein the bottom end of the tablet computer comprises a permanent magnet which is attracted to one of the magnetic elements;
a holding plate configured to be attached to an upper portion of a back of the tablet computer; and
a supporting plate connecting the front plate and the holding plate and spaced from a lower portion of the back of the tablet computer;
wherein the holding plate comprises a first coating layer and a first plate enclosed in the first coating layer, and the supporting plate comprises a second coating layer and a second plate enclosed in the second coating layer;
wherein the first coating layer and the second coating layer are connected to each other to form an integrity, and a gap is defined between the first plate and the second plate.

11. The protective case as claimed in claim 10, wherein the front plate comprises a top surface, and the bottom end of the tablet computer is located on the top surface; the magnetic elements are embedded in the front plate, and top surfaces of the magnetic elements are coplanar with the top surface of the front plate.

12. The protective case as claimed in claim 10, wherein the magnetic elements are elongated protrusions which are parallel to each other, each of the magnetic elements has a configuration corresponding to that of the bottom end of the tablet computer.

13. The protective case as claimed in claim 10, wherein a magnetic pole of each of the magnetic elements towards the bottom end of the tablet computer is opposite to that of the permanent magnet at the bottom end of the tablet computer towards the front plate.

14. The protective case as claimed in claim 10, wherein a hole is defined in the holding plate used to facilitate the shooting of the tablet computer.

15. The protective case as claimed in claim 10, wherein a display window is defined in the holding plate to display the battery status of the tablet computer.

16. The protective case as claimed in claim 10, wherein a bendable portion is located between the holding plate and the supporting plate.

17. The protective case as claimed in claim 16, wherein the first and second coating layers comprise polyurethane material and the first and second plate comprise polycarbonate material.

18. The protective case as claimed in claim 17, wherein the gap has a same width as that of the bendable portion.

19. The protective case as claimed in claim 10, wherein when the permanent magnet at the bottom end of the tablet computer is attracted with one of the magnetic elements on the front plate, the tablet computer stands up at a 60 degree angle towards the front plate; when the permanent magnet at the bottom end of the tablet computer is attracted with another one of the magnetic elements on the front plate, the tablet computer stands up at a 45 degree angle towards the front plate.

* * * * *